H. P. SCHULTE.
HOOK.
APPLICATION FILED JAN. 26, 1911.
1,062,365.
Patented May 20, 1913.
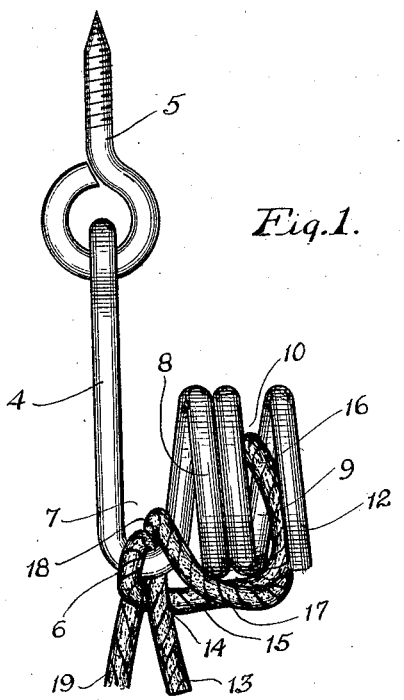
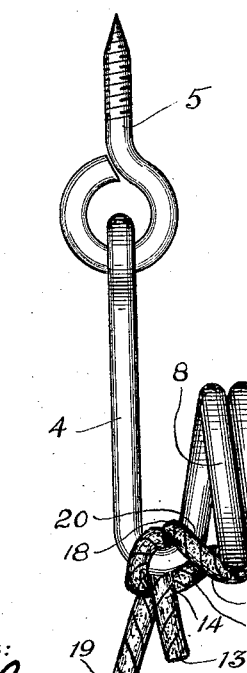
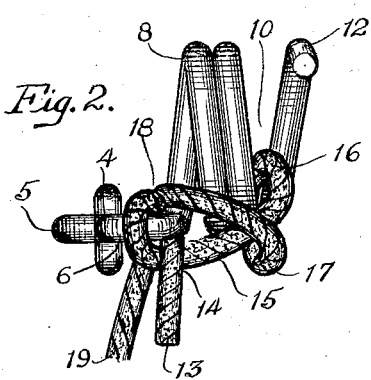
Fig. 1.
Fig. 2.
Fig. 3.
Witnesses:
Ephraim Banning
Jno P Bond
Inventor:
Henry P Schulte
BY Banning & Banning
Attorneys.
COLUMBIA PLANOGRAPH CO., WASHINGTON, D. C.

UNITED STATES PATENT OFFICE.

HENRY P. SCHULTE, OF WHEATON, ILLINOIS, ASSIGNOR TO WILLIAM SNYDER AND CHARLES A. DOLLINGER.

HOOK.

1,062,365.  Specification of Letters Patent.  Patented May 20, 1913.

Application filed January 26, 1911. Serial No. 604,827.

*To all whom it may concern:*

Be it known that I, HENRY P. SCHULTE, a citizen of the United States, residing at Wheaton, in the county of Dupage and State of Illinois, have invented certain new and useful Improvements in Hooks, of which the following is a specification.

This invention relates to a hook particularly intended for use in stringing a clothes line, although I do not intend in any way to limit it to such use.

It will be understood that in stringing a clothes line it is customary to string the same back and forth across a porch or yard, looping it over oppositely disposed hooks, so that in the end a number of strands will be presented on which the clothes may be hung. When using ordinary hooks for this purpose, the line must be tied or otherwise fastened to each hook, otherwise danger will exist that in case of breakage at any one point the entire line will fall to the ground.

The hook of the present invention is so formed that, as the line is strung back and forth and looped onto the hooks, it will be held by each hook in such a way that breakage of one strand will not cause the adjacent strand to fall by allowing the line to slip through the hook.

Objects of the present invention are: to provide a hook for accomplishing the aforementioned purpose; to provide a hook which will not abrade the line, thus wearing it unnecessarily; to provide a hook which will grip the strand by a wedging action, and also by drawing the same against a portion of the hook to naturally create an increasing friction as the tension on the strand increases, whereby the line is held by the hook not only by the wedging action but also by the friction thus created; to provide a hook of such form that the line may be easily and naturally strung into the same without the necessity of tying it, so that a long continuous line may be strung back and forth from hook to hook no matter what its length; to provide a hook which may be easily and cheaply manufactured, and to this end to provide a hook especially adapted for manufacture from wire; and in other ways and manners to provide a generally improved hook for this class of service.

Other objects and uses will appear from a detailed description of the invention, which consists in the features of construction and combination of parts hereinafter described and claimed.

In the drawing, Figure 1 shows a plan view of the hook, with a line looped into the same in the preferred manner, but not drawn tight; Fig. 2 shows a front view of the hook, also with the line looped but not drawn tight; and Fig. 3 shows a view similar to Fig. 1, with the exception that the line has been tightened so that it is held from slippage, not only by the wedging action but also by the aforementioned friction.

In the embodiment of my invention, I provide a hook so formed that the line is held at one point by naturally wedging into a space of continually decreasing width, and is normally held at another point by the aforementioned gripping action, which creates a friction between the line and the hook. Under ordinary circumstances the line will be held in both ways. In case the incoming strand should break it will still be held in both ways to prevent the other strand from falling; and in case the outgoing strand should break the wedging action will still hold the line to prevent the incoming strand from falling.

Referring now to the figures, the hook comprises an arm 4, which may be suitably attached to a wall or post, as by means of an eye 5. The arm is bent rearwardly at a point 6, to present an elbow 7 which is practically in line with the eye, and which elbow serves to receive the incoming and outgoing strands of the line. The wire from which the hook is formed is then looped over once or twice at 8, after which it loops outwardly at 9 to present a wedge-shaped groove 10, the closed portion of which is preferably on the lower portion of the hook and somewhat forwardly of the center of the wire loops. This construction is well illustrated in Figs. 1 and 3, where it is seen that the line pulls forwardly to a point 11 before it wedges tight. The end of the wire from which the hook is formed is carried forwardly on its upper end to a point 12, so as to facilitate placing the line in the wedge 10.

The preferred manner of stringing the line is as follows: The incoming end 13 of the line, be it long or short, is grasped in the left hand, and then the free end of the line is carried down and under the incoming end at a point 14, and is then carried across at 15 and over and down through the wedge 10 at 16. Thereafter it is brought back and crosses the portion 15 at 17, and is then passed down through the elbow 7 at a point 18 and out at 19. In Figs. 1 and 2, the line is shown loose, in the position which it would occupy before being drawn up by throwing a tension on it. In Fig. 3, I show the lines in the position they would occupy after being drawn up by throwing a tension on them. In this case, the portion of the outgoing line at 17 crushes inwardly against the incoming portion 15, so as to force the same against the wire of the hook at a point 20 to create a friction, which helps to prevent the lines from slipping. Obviously, when tension is initially thrown on both of the lines, the portion 16 is drawn tightly into the wedge. This serves to initially lock the line in the hook. As the tension on the lines is increased, they will draw up in the manner shown in Fig. 3, to provide the additional crushing force which creates the friction of the incoming line against a portion of the hook. On account of this friction in addition to the wedging action, it is seen that the slippage which might take place in the wedge is largely eliminated, so that the abrasion of the line in the wedge is greatly reduced.

It is preferred that the hook be formed from round wire, as illustrated, for the reason that it can be easily and cheaply manufactured from the same, and also because the rope will be abraded to the minimum extent when using such wire.

I claim:

A hook of the class described, comprising a single length of wire, extending forwardly from a support and then rearwardly to provide an elbow for the reception of a rope or the like, then looped a plurality of times with the convolutions of the loops spiraling upward and forwardly to provide an abutment, and then looped to provide another convolution lying at an angle to the aforesaid convolutions to provide a wedge shaped opening between the lower portion of an abutment loop and the last mentioned loop, whereby a rope or the like may be extended from the elbow and have its end portion intertwined with the wedge shaped slot, substantially as and for the purpose set forth.

HENRY P. SCHULTE.

Witnesses:
  MARY R. FROST,
  THOMAS A. BANNING, Jr.

---

Copies of this patent may be obtained for five cents each, by addressing the "Commissioner of Patents, Washington, D. C."